May 12, 1970     G. J. ROLANDELLI     3,511,458
AERIAL RECOVERY SYSTEM
Filed May 16, 1968     2 Sheets-Sheet 1
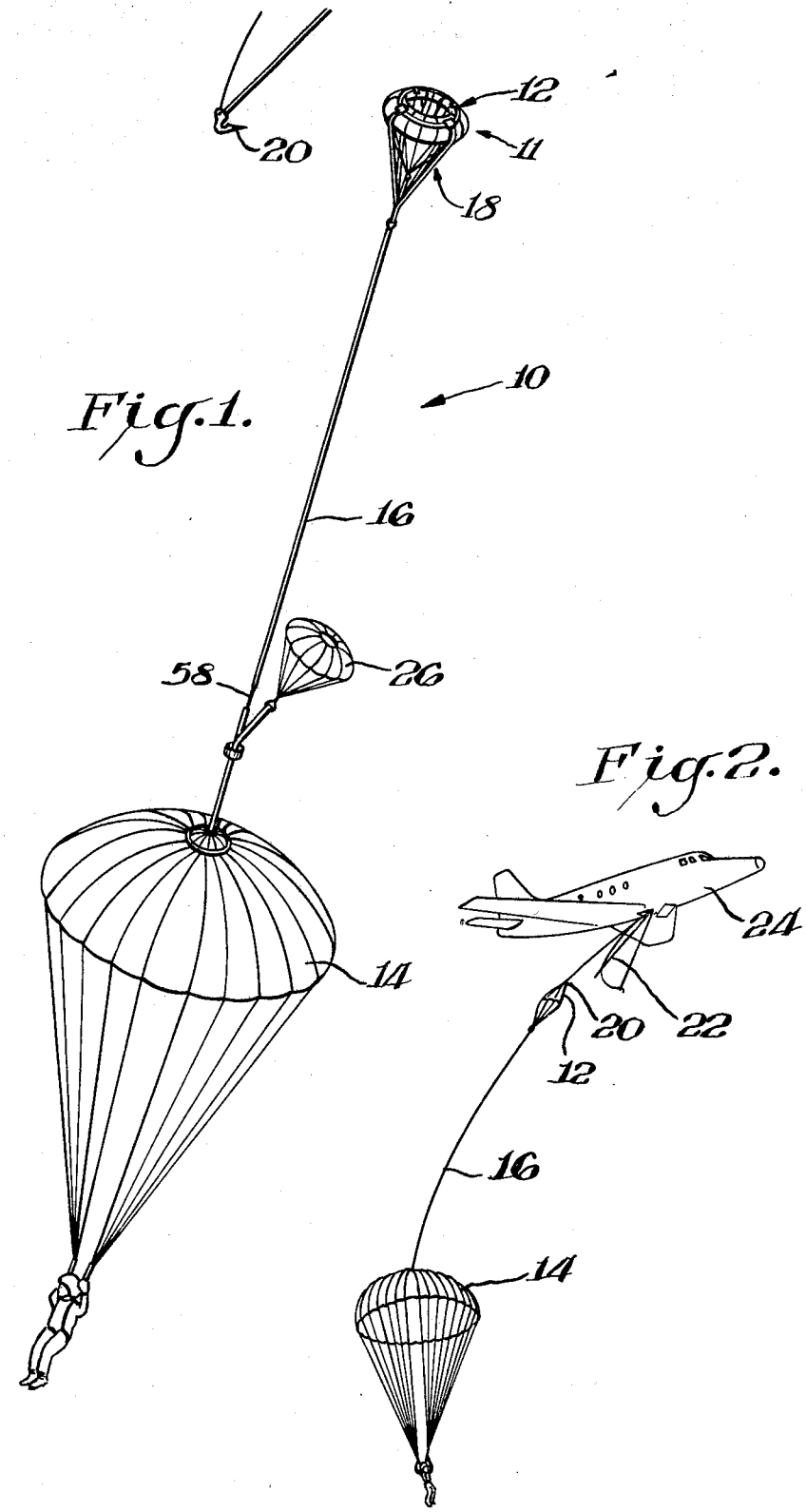

May 12, 1970  G. J. ROLANDELLI  3,511,458
AERIAL RECOVERY SYSTEM
Filed May 16, 1968  2 Sheets-Sheet 2
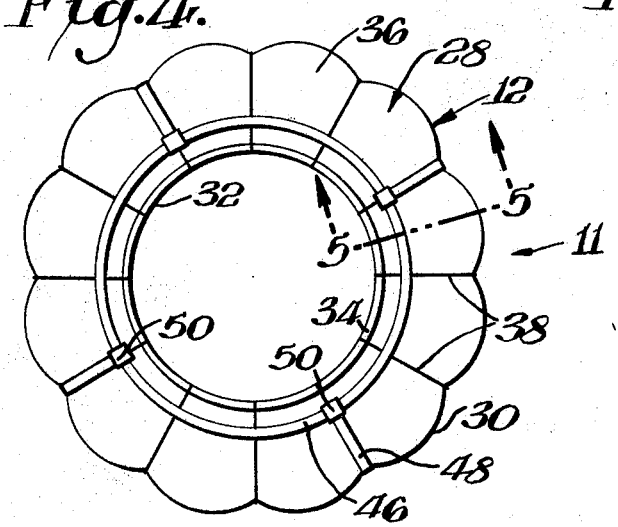
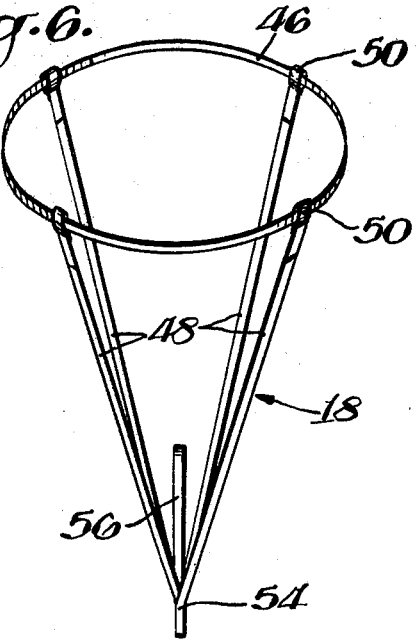
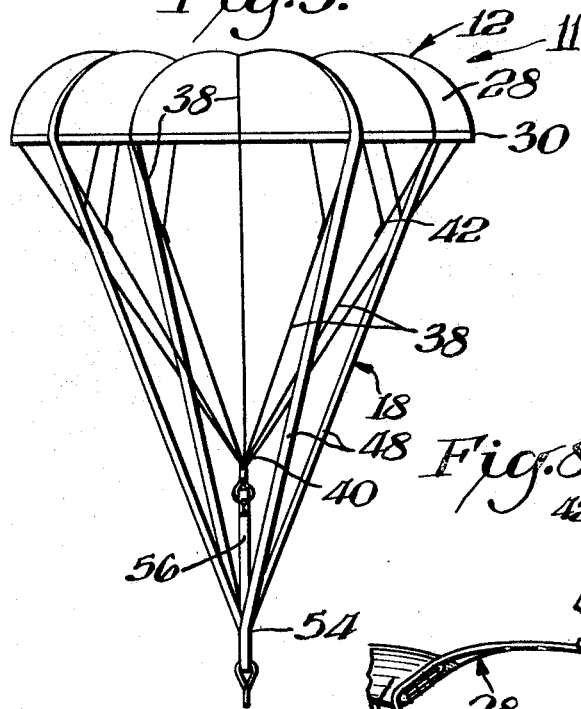
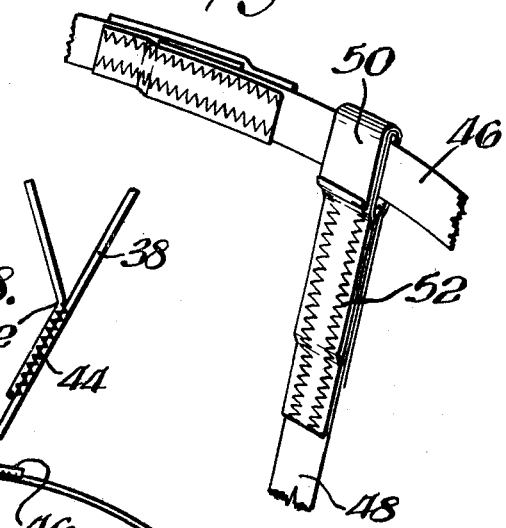
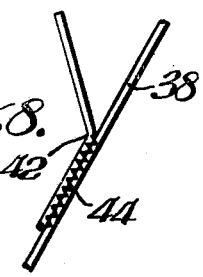
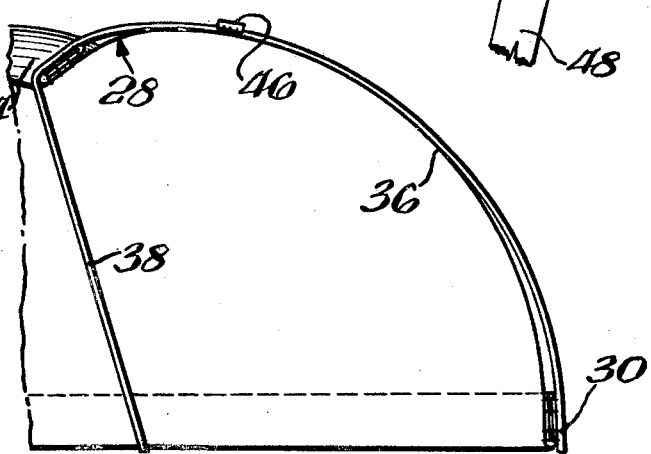

United States Patent Office 3,511,458
Patented May 12, 1970

---

3,511,458
AERIAL RECOVERY SYSTEM
George J. Rolandelli, Wilmington, Del., assignor to All American Engineering Company, Wilmington, Del., a corporation of Delaware
Filed May 16, 1968, Ser. No. 729,579
Int. Cl. B64d 17/22, 17/18
U.S. Cl. 244—142                                   5 Claims

---

ABSTRACT OF THE DISCLOSURE

An airfoil target comprises a parachute including a canopy of low porosity material having a generally circular outer peripheral portion and a central opening surrounded by an inner peripheral canopy portion. Suspension lines secured to the canopy terminate at a connection point spaced from the canopy. A middle canopy portion between the inner and outer peripheral portions extends upwardly from both peripheral portions when the canopy is inflated with air so that the canopy has an inverted annular trough shape when so inflated. A harness associated with the parachute has a circular strap secured to the middle canopy portion and a plurality of linear straps secured to the circular strap that terminate at a connection point spaced from the canopy. The target parachute presents an aerodynamically stabilized target that is large yet light and small when packed.

---

BACKGROUND OF THE INVENTION

The present invention relates to an aerial recovery system, and more particularly to an airfoil target for use in mid-air recovery of a load-carrying parachute connected to it.

In the past, systems have been disclosed for recovering load-carrying parachutes in mid-air. Such systems generally include a payload connected to a main parachute which in turn is connected to an auxiliary or drogue parachute by a towline. The auxiliary chute must be designed so that it falls at a slower rate of descent than the load-carrying parachute in order to maintain the auxiliary chute spaced away from the main chute during recovery for safety reasons. Actual recovery is achieved by grappling the auxiliary chute from an airborne recovery craft. The prior recovery arrangements have failed to provide a stable auxiliary parachute with high lifting power and miniature size. For the most part, the prior auxiliary parachutes are characterized by their bulky nature as well as their overall complexity. The above disadvantages have rendered many recovery systems unsuitable for their intended purpose.

Accordingly, it is an object of the present invention to provide an airfoil target having sufficient lifting power which functions in an efficient and trouble-free manner.

Another object of the present invention is to provide an airfoil target having a unique harness that facilitates efficient mid-air recovery of a load-carrying parachute connected to the harness.

SUMMARY OF THE INVENTION

The present invention relates to an airfoil target comprising a parachute having a canopy of low porosity material with a generally circular outer peripheral portion. The canopy has a central opening, preferably circular, surrounded by an inner peripheral canopy portion. Suspension lines are secured to the canopy and terminate at a connection point spaced below the canopy. A middle canopy portion between the inner and outer peripheral portions extends upwardly from both peripheral portions when the canopy is inflated with air so that the canopy has an inverted annular trough shape when so inflated. A harness associated with the parachute has a circular strap secured to the middle canopy portion and a plurality of linear straps secured to the circular strap that terminates at a connection point spaced from the canopy.

The linear straps of the harness may include looped end portions surrounding the circular strap for securing the linear straps thereto. Further, a connecting link may be provided between the connection point of the suspension lines and the connection point of the linear straps of the harness.

The airfoil target may be connected to a load-carrying parachute by a towline secured between the harness and the load-carrying parachute. Moreover, the towline may include a weakened portion connected in series with the remaining portions of the line arranged to break when the tension of the towline exceeds a predetermined maximum.

BRIEF DESCRIPTION OF THE DRAWING

Novel features and advantages of the present invention in addition to those mentioned above will become apparent to one skilled in the art from a reading of the following detailed description in conjunction with accompanying drawing wherein similar reference characters refer to similar parts and in which:

FIG. 1 is a pictorial view of an aerial recovery system according to the present invention prior to mid-air recovery;

FIG. 2 is a pictorial view similar to FIG. 1 illustrating the aerial recovery system immediately after recovery;

FIG. 3 is a side elevational view of an airfoil target according to the present invention;

FIG. 4 is a top plan view of the airfoil target shown in FIG. 3;

FIG. 5 is a sectional view taken along line 5—5 of FIG. 4;

FIG. 6 is a perspective view of the harness of the airfoil target according to the present invention;

FIG. 7 is an enlarged perspective view of a portion of the harness shown in FIG. 6; and FIG. 8 is an enlarged elevational view of a portion of the suspension lines of the airfoil target illustrated in FIGS. 3 and 4.

DETAILED DESCRIPTION OF THE INVENTION

Referring in more particularly to the drawing, an aerial recovery system 10 comprises an airfoil target 11 including a target parachute 12 and a target harness 18. In use, the harness 18 is connected to a main load-carrying parachute 14 by a towline 16. FIG. 1 illustrates the aerial recovery system 10 prior to mid-air recovery with a grappling hook 20 or similar device positioned away from the target airfoil 11. The grappling hook 20 is connected to a suitable pickup 22 carried by a recovery aircraft 24. Moreover, a power winch (not shown) may be provided for reeling the load-carrying chute 14 into the aircraft 24 after recovery. The system 10 also includes a pilot parachute 26 which assists in pulling the airfoil target 11 and the towline 16 from the main parachute package in which these members are initially disposed. Accordingly, when a payload is ejected from an aircraft or space vehicle, for example, and the package carrying the main parachute 14 opened, the pilot parachute 26 disposed in that package pulls the towline and the airfoil target from it.

The target parachute 12 comprises a canopy 28 constructed of a plurality of panels stitched together along their sides. The canopy material has a low porosity and its particular design provides sufficient lifting power to sustain the weight of the load line and target harness and provide a maximum width target with minimum packed volume and weight. The rate of descent of the target parachute 12 is less than that of the main parachute 14 and this differential maintains the towline 16 taut during descent of the system 10.

The canopy 28 of the target parachute 12 has a generally circular outer peripheral portion 30 and a large central opening 32 surrounded by an inner peripheral canopy portion 34. Additionally, the canopy 28 has a middle portion 36 between the inner and outer peripheral portions. As shown best in FIG. 5, the middle canopy portion 36 extends upwardly from both the inner and outer peripheral canopy portions when the canopy is so inflated with air during its descent. Thus, when the canopy is so inflated it has a generally inverted trough shape with the circular opening 32 spaced below the uppermost point of the middle canopy portion 36. This particular canopy design provides high lifting power and facilitates safe and troublefree mid-air recovery of the load-carrying parachute 14.

The target parachute 12 also includes an arrangement of suspension lines 38 for maintaining the canopy in the desired configuration during its descent. The suspension lines extend in an upward direction from a connection point 40 to the outer peripheral canopy portion 30. From this point they extend upwardly over the middle canopy portion 36 and then downwardly into the central circular opening 32. From the opening 32 they extend downwardly and are ultimately attached at point 42, as shown in FIG. 8. Stitching 44 is provided to make the connection. Additionally, stitching or other suitable means may be utilized to secure the suspension lines to the canopy where they engage one another.

The target harness 18 is secured to the target parachute 12 and provides an arrangement for connecting the system to the grappling hook 20 during a mid-air snatch. In this regard, the target harness comprises a circular strap 46 connected to the middle canopy portion 36, as shown in FIG. 4. Stitching may be provided to secure the circular strap to the canopy. The target harness also includes a plurality of linear straps 48 each of which includes an upper looped end portion 50 that surrounds the circular strap 46 to connect the linear straps to the circular strap. Here again, stitching 52 is provided adjacent the looped end portion 50 for strengthening purposes. The linear straps 48 of the target harness terminate at a connection point 54 spaced below the canopy 28, as shown in FIG. 3. Connection point 54 is slightly below the connection point 40 of the suspension lines 38 and a connecting link in the form of a band 56 connects these points together. The band 56 functions to maintain the suspension lines taut during descent of the parachute 12 which in turn maintains the canopy 28 in the desired configuration.

As mentioned above, the target harness 18 is connected to the load-carrying parachute 14 by the towline 16. Towline 16 is secured at its upper end to the target harness near connection point 54, as shown in FIG. 3. The towline includes a weakened portion 58 connected in series with the remaining portions of the towline designed to break when the tension in the towline exceeds a predetermined maximum, such as 3,000 lbs. tension, for example. Preferably, the weakened portion is located close to the main load-carrying parachute 14 so that little if any towline interference with the main parachute occurs when the weakened portion breaks. The weakened portion 58 of the towline functions to prevent damage or injury to the load carried by the main parachute 14 whether it be aircraft personnel or equipment. Without the weakened portion damage to the system and/or the recovery craft 24 might occur under severe stress conditions.

The aerial recovery system described above may be used in conjunction with load-carrying parachutes ejected from space vehicles or conventional aircraft flying at either high or low altitudes. The target parachute 12, target harness 18 and towline 16 are relatively small and occupy little space. Moreover, they are relatively light which makes them easy to handle and pack into the main parachute package. Once the canopy of parachute 14 is inflated with air, the overall system assumes the position shown in FIG. 1. The grappling hook 20 is then directed into engagement with the harness to facilitate mid-air recovery of the system. Moreover, the system may be used to recover aircraft personnel, cargo or scientific instruments, for example.

What is claimed is:

1. An airfoil target comprising a parachute having a canopy of low porosity material having a generally circular outer peripheral portion, a central opening in the canopy surrounded by an inner peripheral canopy portion, suspension lines secured to the canopy and terminating at a connection point spaced from the canopy, a middle canopy portion between the inner and outer peripheral canopy portions extending upwardly from both the inner and outer peripheral portions when the canopy is inflated with air during its descent whereby the canopy has an inverted annular trough shape when so inflated, and a harness having a circular strap secured to the middle portion of the canopy with a plurality of linear straps each secured at one end thereof to the circular strap and each terminating at its other end at a connection point spaced from the canopy.

2. An airfoil target as in claim 1 wherein each of the linear straps of the harness has a looped end portion surrounding the circular strap of the harness for securing the linear straps thereto.

3. An airfoil target as in claim 1 wherein the connection point of the suspension lines is spaced from and above the connection point of the linear harness straps, and connecting means extending between the connection point of the suspension lines and the connection point of the linear harness straps.

4. An airfoil target as in claim 1 in combination with a load-carrying parachute and a towline connected between the harness and the load-carrying parachute.

5. The combination of claim 4 wherein the towline has a weakened portion connected in series with the remaining portions of the towline, the weakened portion being constructed and arranged to break when the tension in the towline exceeds a predetermined maximum whereby the airfoil target is separated from the load-carrying parachute when the towline tension exceeds the predetermined maximum.

References Cited
UNITED STATES PATENTS

| | | | |
|---|---|---|---|
| 2,523,276 | 9/1950 | Buhler | 244—142 |
| 3,137,465 | 6/1964 | Mulcahy | 244—142 |
| 3,227,403 | 1/1966 | Ferguson | 244—145 |
| 3,429,532 | 2/1969 | Sepp | 244—145 |

MILTON BUCHLER, Primary Examiner

J. E. PITTENGER, Assistant Examiner